US005230563A

United States Patent [19]

Shalvi

[11] Patent Number: 5,230,563

[45] Date of Patent: Jul. 27, 1993

[54] LIQUID LEVEL MONITORING DEVICE

[75] Inventor: Ram Shalvi, Kwai Chung, Hong Kong

[73] Assignee: Solar Wide Industrial Ltd., Hong Kong, Hong Kong

[21] Appl. No.: 776,234

[22] PCT Filed: May 8, 1990

[86] PCT No.: PCT/GB90/00713

§ 371 Date: Dec. 31, 1991

§ 102(e) Date: Dec. 31, 1991

[87] PCT Pub. No.: WO90/13881

PCT Pub. Date: Nov. 15, 1990

[30] Foreign Application Priority Data

May 8, 1989 [GB] United Kingdom ................. 8910517

[51] Int. Cl.[5] ........................ G01K 13/00; G08B 21/00

[52] U.S. Cl. .................................... 374/141; 340/620; 73/292; 73/304 R

[58] Field of Search ............. 73/292, 304 R; 340/584, 340/620, 622, 618; 374/142, 141, 163, 170; 4/496, 559

[56] References Cited

U.S. PATENT DOCUMENTS

| | | | |
|---|---|---|---|
| 3,588,859 | 6/1971 | Petree | 340/620 |
| 3,732,556 | 5/1973 | Caprillo et al. | 340/620 |
| 4,231,025 | 10/1980 | Turner, Jr. | 340/620 |
| 4,406,550 | 9/1983 | Gray | 374/170 |
| 4,435,095 | 3/1984 | Jones et al. | 374/194 |
| 4,710,755 | 12/1987 | Gurney | 340/585 |
| 4,922,226 | 5/1990 | Hsieh et al. | 73/292 |
| 5,048,131 | 9/1991 | Stephen | 4/559 |

FOREIGN PATENT DOCUMENTS

| | | | |
|---|---|---|---|
| 58-156816 | 12/1983 | Japan . | |
| 59-72031 | 4/1984 | Japan . | |
| 60-239622 | 11/1985 | Japan | 73/292 |
| 491451 | 7/1970 | Switzerland . | |

OTHER PUBLICATIONS

Elektor, vol. 1, No. 5 Jul./Aug. 1975, Author-Anonymous; Great Britain, "Temperature Monitor" p. 742.

*Primary Examiner*—William A. Cuchlinski, Jr.
*Assistant Examiner*—G. Bradley Bennett
*Attorney, Agent, or Firm*—Eckert Seamans Cherin & Mellott

[57] ABSTRACT

A liquid monitoring device includes means for detecting the presence of a liquid and means for giving an alarm when the liquid is detected. Preferably a temperature sensor is also provided and the temperature is displayed on an LCD. The temperature sensor is arranged to sense the ambient air temperature at a first sampling rate and then the liquid temperature, after the liquid has been detected by a detector, at a second, more frequent sampling rate. The components are housed in a casing which carries a pivotably mounted sucker for attachment to a wall or bath.

9 Claims, 2 Drawing Sheets

LIQUID LEVEL MONITORING DEVICE

The present invention relates to a liquid level monitoring device.

The invention provides a liquid level monitoring device comprising detecting means for detecting the presence of a liquid, and alarm means for indicating when liquid is detected by the detecting means. There is also provided temperature sensing means for measuring temperature, and display means for displaying the measured temperature.

The device includes a housing for housing component parts of the device and mounting means on the housing for removably mounting the device on the wall of a vessel, such as a bath. Preferably the mounting means is pivotably mounted on the housing. Preferably the mounting means comprises a sucker which is pivotably mounted on the housing. Preferably, the detecting means, alarm means, temperature sensing means and display means are electrical or electronic devices and are preferably powered by an onboard battery power supply.

The alarm means may be an audible alarm such as a buzzer which sounds when liquid is detected. Means may also be provided for indicating audibly and/or visually when the detected temperature is above or below a predetermined value.

Other preferred features and advantage of the invention will be apparent from the following description and the accompanying claims.

The invention will be further described by way of example with reference to the accompanyings, in which.

Figure 1:
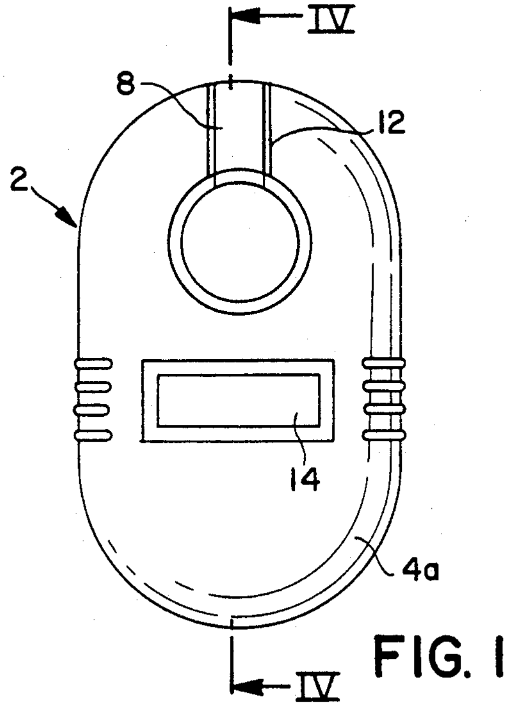
FIG. 1 is a front view of a liquid level monitoring device forming an embodiment of the invention.
Figure 2:
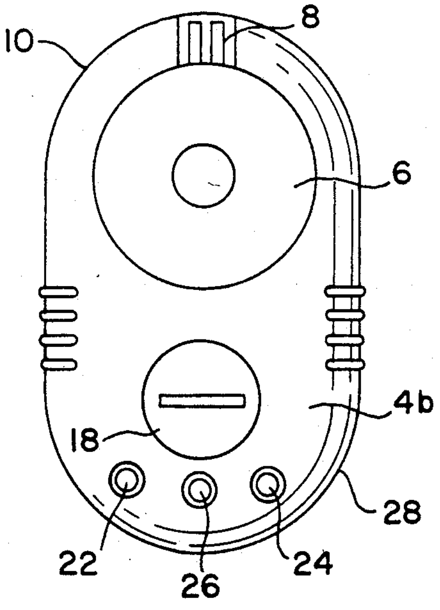
FIG. 2 is a rear view of the device of FIG. 1.
Figure 4:
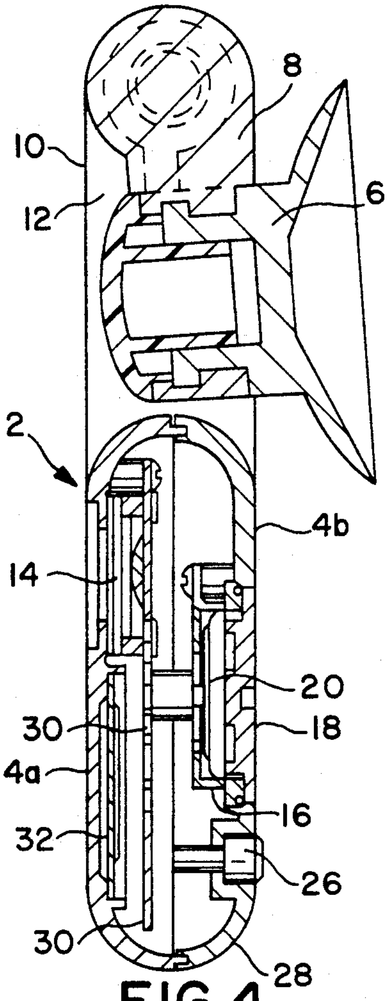
FIG. 4 is a cross-section along the line IV—IV of FIG. 1 on an enlarged scale.
Figure 3:
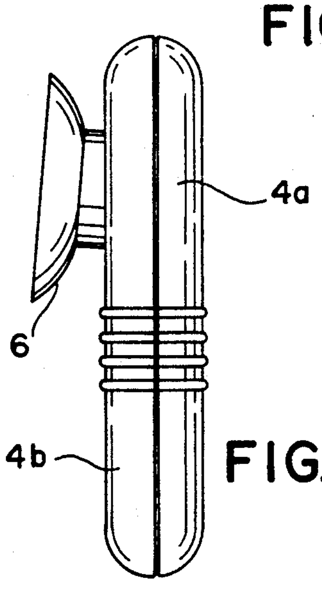
FIG. 3 is a side view of the device of FIG. 1.

Referring to the drawings, a liquid level monitoring device 2 forming an embodiment of the invention comprises a plastics housing 4 formed by front and rear half shells 4*a* and 4*b* which are welded together to form a watertight joint.

A sucker 6 is attached to an arm 8 which is pivotably mounted on an upper end 10 of the housing 4. The arm 8 pivots in a slot 12 in the housing.

A liquid crystal display 14 is mounted on the front half shell 4*a*. The rear half shell 4*b* carries a battery compartment 16 which is closed by a removable cover 18 and houses a battery 20. Two contacts or electrodes 22, 24, and a temperature sensitive transducer 26 extend through the wall of the rear half shell 4*b* and are positioned near the lower end 28 of the housing 4. Transducer 26 is positioned below contacts 22, 24 so that it will be covered by liquid when the contacts 22, 24 are bridged by the liquid.

A printed circuit board 30 carrying electronic circuitry for the device and a buzzer 32 are mounted inside the housing 4.

Figure 5:
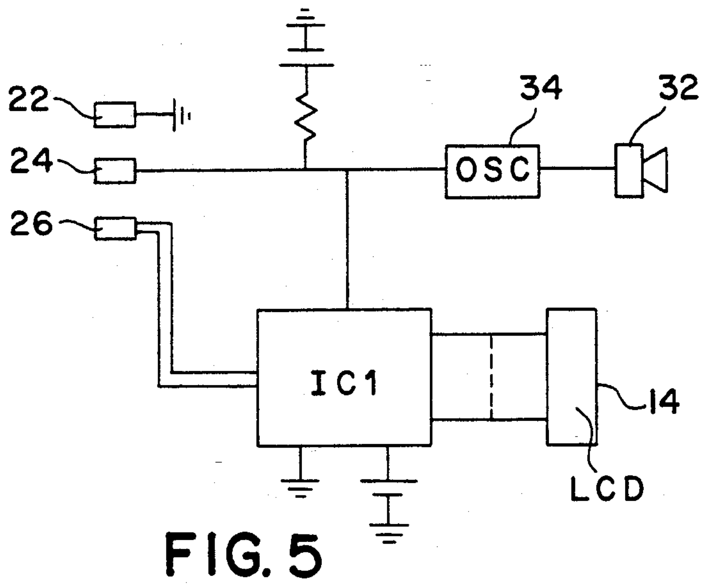
FIG. 5 is a schematic circuit diagram for the device of FIG. 1.

Referring to FIG. 5, the temperature sensitive transducer 26 is connected to an integrated circuit IC1 which displays the measured temperature on the liquid crystal display 14.

The presence of liquid is detected by contacts 22, 24. When the contacts are immersed in liquid such as bath water which forms a relatively low resistance path between the contacts, contact 24 is earthed which triggers an oscillator 34 which sounds buzzer 32 for a predetermined period, preferably about 10 to 20 seconds.

Earthing of terminal 24 also signals IC1. IC1 is arranged to measure the temperature, through contact 26, about once every 10 seconds whilst contact 24 is high (not earthed) and display the (new) measured temperature on display 14. When contact 24 goes low (earthed through the liquid and contact 22), IC1 measures the temperature about every 1 second.

An on-off switch (not shown) may be provided to conserve power when the device is not in use. Also IC1 may be adapted to drive the buzzer, preferably at different frequencies, to sound an alarm when the measured temperature falls below or goes above preset limits. Additional switches may be provided for setting the preset limits.

In use, the device is mounted on a wall by means of sucker 6, for example inside a bath or at ground level on a room wall. The housing 4 may be pivoted around to enable the display 14 to be read easily and adjust the height of contacts 22, 24, 26. The ambient air temperature will be sensed about every 10 seconds and displayed on display 14. The display displays the temperature continuously and is updated by IC1 after each sampling. When liquid forms an electrical path between the contacts 22, 24, the buzzer 32 is sounded for about 10 seconds. At this time contact 26 will be immersed in the liquid and the temperature is sensed every one second and displayed on the display 14.

Figure 6:
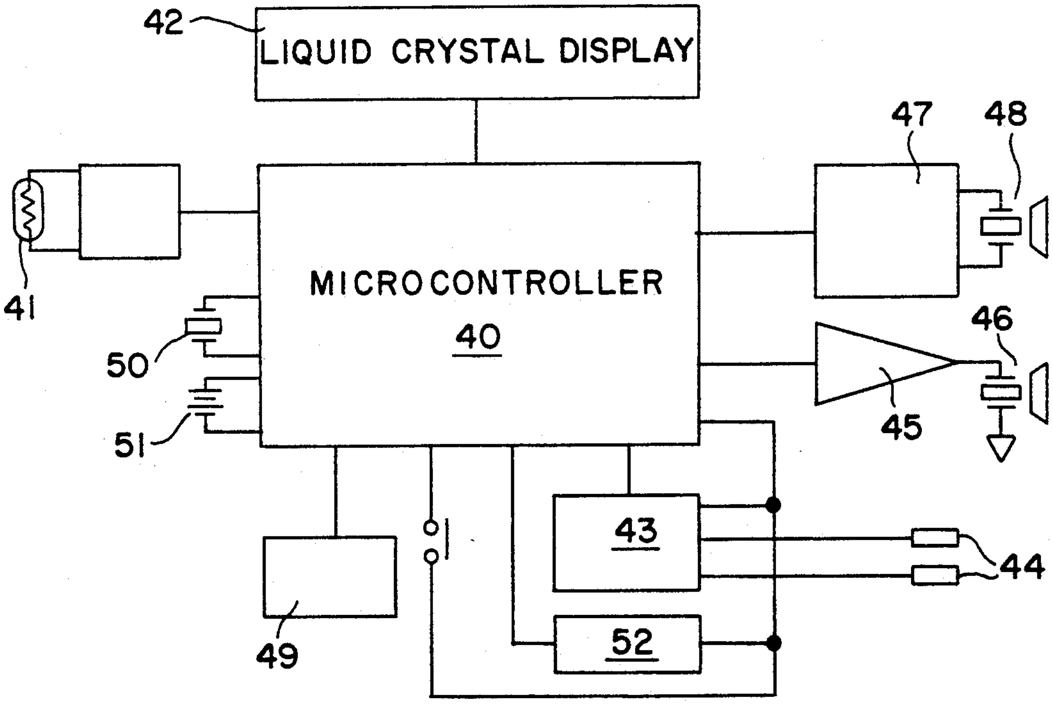
FIG. 6 is a schematic circuit diagram of another monitoring device.

Referring to FIG. 6, another monitoring device comprises a microcontroller 40, connected to a temperature sensor 41, which drives a liquid crystal display 42 for displaying the temperature sensed. The presence of liquid adjacent the sensor is detected by a liquid level detector 43 provided with electrical contacts 44 which are both covered by the liquid when it reaches a desired level. A driver 45 and buzzer 46 are provided to produce audible signals as explained below and a melody chip 47 and speaker 48 are also provided. A range selector 49 to set three chosen temperature ranges of the monitoring device provides input signals for the microcontroller 40. A crystal oscillator 50, a battery 51 and a battery condition detector 52 are connected to the microcontroller 40.

In use, any one of three ranges of temperature can be keyed in by the selector 49. The ranges are identified as an infant, a toddler and an adult range. When the sensed temperature is high, and beyond the upper end of a selected range, HIGH is displayed on the display 42. When the temperature is low, and beyond the lower end of the range, LOW shows on the display 42. If temperature sensed is within a presently selected range, SAFE shows on the display 42.

At the same time or alternatively a melody or soft alarm is provided by the speaker 48. For example, if temperature is high, beyond the range, the melody or soft alarm lasts for, say, 15 seconds and is repeated every minute for as long as the temperature remains high.

Typical chosen temperature ranges are for infants 36° to 38° C., for toddlers 34° to 40° C. and for adults 32° to 42° C.

The audible alarm and/or melody output are normally arranged to provide a different noise pattern or frequency, or a different melody to correspond to different situations. The user can then identify from the different audible alarms or melodies what the conditions are that are being monitored without needing to look at the display 42. This may be very useful when the user is unable to see the mounting device because it is out of view or the user has no or poor eyesight.

The liquid level is determined by measuring the effective impedance between exposed electrodes 22 and 24, or electrodes 44. In the described arrangements this is carried out by applying a voltage in which the polarity is changed. As a result, there is little or no tendency for the exposed electrodes to corrode.

Various modifications may be made to the described embodiment and it is desired to include all such modifications as fall within the scope of the accompanying claims. For example, the devices may be arranged to sense the liquid by detecting a change in capacitance between the contacts 22, 24, or the contacts 44.

I claim:

1. A watertight liquid level monitoring device comprising a housing for housing component parts of the device and mounting means on the housing for detachably mounting the device on a wall or the like, including a combination of component parts comprising detecting means for detecting the presence of a liquid, alarm means for indicating when liquid is detected by the detecting means, temperature sensing means for measuring temperature and display means for displaying the measured temperature, in which the detecting means comprises two electrodes and the liquid is detected by a change in effective impedance therebetween when they are bridged by the liquid, and the temperature sensing means includes a temperature sensor positioned in the housing so as to be covered by the liquid when the electrodes are bridged by the liquid.

2. A device as claimed in claim 1, in which the mounting means is pivotably mounted on the housing for pivotal movement of the housing relative to said wall or the like.

3. A device as claimed in claim 1, in which the alarm is audible and sounds for a limited period of time on detection of the liquid.

4. A device as claimed in claim 2, in which the alarm is audible and sounds for a limited period of time on detection of the liquid.

5. A liquid monitoring device according to claim 1, including means for applying a voltage across the electrodes with alternating polarity when measuring the impedance.

6. A device as claimed in claim 1, in which the temperature sensing means is arranged to sample ambient air temperature at a first predetermined rate and to sample the liquid temperature at a second predetermined rate.

7. A device as claimed in 1, further comprising means for selectably setting different temperature ranges for use respectively with different classes of users, and means for indicating whether the temperature is within the selected range.

8. A device according to claim 7, in which the display means is arranged to indicate selectively whether the temperature is above the selected range, within the selected range or below the selected range.

9. A device according to claim 8, in which an audible output is provided comprising a melody generating circuit.

* * * * *